Figure 1:
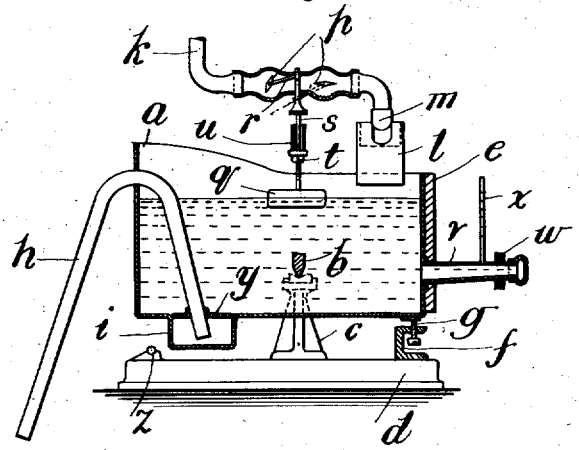

W. LEINERT.

APPARATUS FOR WEIGHING LIQUIDS.

APPLICATION FILED SEPT. 14, 1909.

Reissued Jan. 4, 1910. 13,074.

WITNESSES:

W. S. Kennedy.

Philip N. Tilden.

INVENTOR

Wenzel Leinert

BY

Philipp Lamy & Rice & Kennedy

ATTORNEYS

UNITED STATES PATENT OFFICE.

WENZEL LEINERT, OF MOSCOW, RUSSIA, ASSIGNOR, BY DIRECT AND MESNE ASSIGNMENTS, OF ONE-HALF TO FRANK C. LLOYD, OF NEW YORK, N. Y.

APPARATUS FOR WEIGHING LIQUIDS.

13,074. Specification of Reissued Letters Patent. Reissued Jan. 4, 1910.

Original No. 863,032, dated August 13, 1907, Serial No. 267,561. Application for reissue filed September 14, 1909. Serial No. 517,751.

*To all whom it may concern:*

Be it known that I, WENZEL LEINERT, engineer, a subject of the Russian Emperor, and resident of Moscow, Russia, have invented certain new and useful Improvements in Apparatus for Measuring Liquids, of which the following is a specification.

With my apparatus for measuring liquids—consisting of a pair of measuring vessels of the same size filled alternately by a distributing trough (chute) and emptied by siphons set in operation, as further described, by tilting of the said vessels on their axis, whereby the trough is reversed also—the drawback has shown itself that with an unequal supply of the liquid, toward the end of the filling, at the moment of the reversing of the trough, a column of liquid of a varying thickness presses upon the surface of the liquid in the measuring vessels, which interferes with the precision of the measuring. In order to remove this drawback in the present invention which relates to liquid-meters of the above-mentioned kind, the arrangement has been made that, shortly before the termination of the filling, the supply is for each vessel gradually and automatically slackened, that is to say, the pressure of the entering column of liquid upon the surface of the liquid in the vessel is reduced and made uniform. This is attained by providing a throttle-screen in the supply pipe for each measuring vessel, which is regulated by a float arranged in the vessel and raised toward the end of the filling period.

A further drawback was, that with changing temperature of the liquid to be measured the unequal displacements of the centers of gravity on both sides of the axis of tilting of the unsymmetrical vessels, affected badly the accuracy of the apparatus. The invention therefore further comprises a compensation-pipe on each measuring vessel, by which the bad influence of changing temperature is avoided.

The drawing illustrates the new device on a liquid meter.

Figure 2:
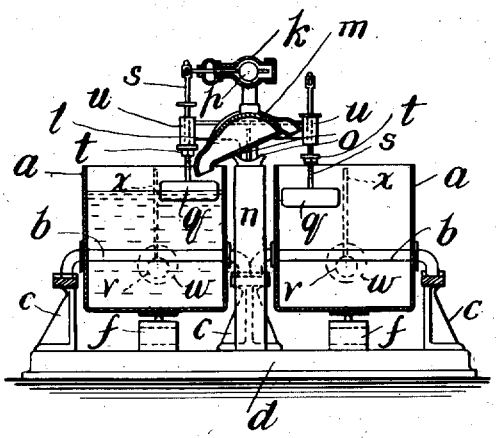
Figure 3:
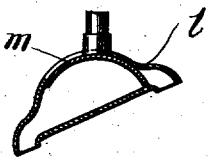

Figure 1 is a vertical section of the same, Fig. 2 a cross section. Fig. 3 is an enlarged sectional view of the tilting spout.

Similar letters refer to similar parts throughout the several views.

*a* are the two measuring vessels of equal size, through which cross-bars *b* pass, which rest with their sharp-edged ends on supports *c* of the bottom plate *d* in a manner that the tilting-axis lies outside of the plane of the center of gravity of the contents of the vessel, while a compensating-weight *e* fastened to the back wall of the smaller part of the vessel, keeps the vessel, when empty, in a horizontal position, so that it rests with the weighted end on the ledge *f* or an adjusting screw *g* arranged in the same. At the opposite end of the measuring vessel is arranged a siphon *h* which dips into a recessed part *i* of the bottom of the measuring vessel covered by a sieve *y*, and whose crown or vertex is, when the measuring vessel is placed horizontally, still above the highest level of the liquid. The wall of the vessel is higher on this side, in order that the liquid, on the vessel being tilted, cannot flow over the edge of the same. If the measuring vessel has received the quantity of liquid to be measured the part of the vessel opposite to that with the weighted wall, becomes the heavier, and the vessel tilts until it strikes against the rubber plate *z* on the base-plate. The level of the liquid is now above the top of the siphon, the siphon commences to act and the vessel is emptied, whereupon the same vessel is tilted back into the horizontal position by the counter-weight *e*.

The liquid is conveyed alternately through the pipe *k* and trough *l* to the one or other measuring vessel. For this purpose the trough *l* tilts about an axis on the frame, the tilting-movement being limited by projections *o* on the support *n* of the frame, so that the trough does not lie upon the wall of the vessel which is being filled, in order that the tilting of the vessel can take place uninfluenced by the pressure of the trough. The full vessel when tilting strikes against the trough *l* and reverses it, so that the liquid now enters into the other vessel. To avoid splashing of the entering liquid, under the semi-circular cover of the distributing trough a cap *m* is fastened on the lower end of the supply pipe.

The above described and already known arrangement has the drawback that with an unequal supply of liquid toward the end of the filling, at the commencement of the reversing of the trough a column of liquid of a varying thickness presses on the surface of the liquid in the vessel to be filled, by which the measuring is rendered inexact. To remove this drawback I have arranged in the supply-pipe *k* two throttle-screens *p* with levers *r*, which are turned by the rods of the floats *q*, when the float rises alternately in one or the other measuring vessel, whereby the supply is slackened toward the end of the filling, so that the inpouring quantity of liquid is reduced and made more uniform, and the measuring made more exact. The floats must lie exactly above the tilting-axis of the vessels.

In order to be able to vary the degree of the throttling, the rod *s* of the float *q* is provided at its lower end with a nut *t*, which, when the float rises, strikes against the arms *u* of the support *n* of the frame. According to the adjustment of the nut *t* the throttle-screen is more or less closed. The upper part of the rods *s*, guided in the frame is provided with a longitudinal aperture to allow the levers *r* a free movement in the rods. Instead of using two throttle-screens as shown in the drawing, a single one may be used, which is connected with each float by a lever.

In order to avoid the drawback resulting from the influence of changing temperature of the liquid each measuring vessel has been provided on the back-wall, which is near to the tilting-axis, with a compensation-pipe *v*, preferably made of a material of a greater coefficient of expansion than the material of the measuring vessel. The compensation-pipe *v* is provided with an adjustable regulating-weight *w* and carries an air pipe *x* through which the air can escape, when the liquid enters the compensation pipe.

I prefer to construct the body of the vessel *a* of sheet iron and a compensating tube *u* of brass or copper. It will be understood that under changing atmospheric conditions or with liquids of different temperatures the resulting expansion and contraction of the metal of the body portion *a* will be relatively greater at the left of the cross bar *b*, referring to Fig. 1, than at the right thereof. By the provision of the compensating tube *u* this difference of expansion or contraction will be regulated. Where liquid of a greater specific gravity is measured and where the vessel *a* would normally tilt before the required volume of liquid had been received by the vessel *a* the weight *w* would be adjusted to either retard or induce such tilting action.

By a suitable sizing of the throttle screens and the compensation-pipes the liquid-meter acts in such an accurate manner, that it can be used even for physical and chemical measurings.

What I claim as my invention and desire to secure by United States Letters Patent is:—

1. A measuring apparatus comprising in combination independently tiltable vessels, a tiltable supply or filling spout operated by said vessels to alternately shut off supply of liquid thereto, a supply pipe for said spout, throttle screens in said pipe for retarding the passage of liquid therethrough, floats in said vessels for operating said screens, an emptying siphon passing through one of the walls of each vessel and an adjustable weight on the opposite wall of the vessel for retilting the vessel after emptying.

2. A measuring apparatus comprising in combination independently tiltable vessels, a tiltable supply or filling spout operated by said vessels to alternately shut off and supply liquid thereto, a supply pipe for said spout, throttling means for said pipe retarding the passage of liquid therethrough, floats in said vessels for operating said throttling means, an emptying siphon passing through one of the walls of each vessel and an adjustable weight on the opposite wall of the vessel for retilting the vessel after emptying.

3. A measuring apparatus comprising tiltable measuring vessels, a tiltable supply or filling spout operated by said vessels to alternately shut off and supply liquid thereto, a supply pipe for said spout, throttling means for said pipe retarding the passage of liquid therethrough, floats in said vessels for operating said throttling means, an emptying siphon passing through one of the walls of each vessel, an adjustable weight on the opposite wall of the vessel for retilting the vessel after emptying, said vessels composed of a material of a given coefficient of expansion, and a compensating pipe for said vessels composed of a material having a relatively greater coefficient of expansion than the material of which the vessels are composed, said compensating pipe projecting from the wall of the vessels bearing the weight for retilting the vessels after emptying.

4. A measuring apparatus comprising tiltable measuring vessels, a tiltable supply or filling spout operated by said vessels to alternately shut off and supply liquid thereto, a supply pipe for said spout, throttling means for said pipe retarding the passage of liquid therethrough, floats in said vessels for operating said throttling means, an emptying siphon passing through one of the walls of each vessel, an adjustable weight on the opposite wall of the vessel for retilting the vessel after emptying, said vessels composed of a material of a given coefficient of expansion, and compensating means for said vessels composed of a material having a relatively greater coefficient of expansion than the material of which the vessels are composed, said compensating means being located at the wall of the vessels bearing the weight for retilting the vessels after emptying.

5. A measuring apparatus comprising tiltable measuring vessels, a tiltable supply or filling spout operated by said vessels to alternately shut off and supply liquid thereto, a supply pipe for said spout, throttling means for said pipe retarding the passage of liquid therethrough, floats in said vessels for operating said throttling means, an emptying siphon passing through one of the walls of each vessel, an adjustable weight on the opposite wall of the vessel for retilting the vessel after emptying, said vessels composed of a material of a given coefficient of expansion, and compensating means for said vessels composed of a material having a relatively greater coefficient of expansion than the material of which the vessels are composed, and an adjustable weight for said compensating means, said compensating means being located at the wall of the vessels bearing the weight for retilting the vessels after emptying.

6. A measuring apparatus comprising in combination independently tiltable vessels, a supply pipe and means for alternately shutting off and supplying liquid to said vessels, throttling means for said pipe retarding the passage of liquid therethrough, and floats in said vessels for operating said throttling means.

7. A measuring apparatus comprising in combination tiltable vessels, a tiltable supply or filling spout operated by said vessels to alternately shut off and supply liquid to said vessels, a supply pipe for said spout, throttling means for said pipe retarding the passage of liquid therethrough, and floats in said vessels for operating said throttling means.

8. A measuring apparatus comprising a tiltable measuring vessel, a supply pipe and means for alternately shutting off and supplying liquid to said vessel, throttling means for said pipe retarding the passage of liquid therethrough, and a float in said vessel for operating said throttling means.

9. A measuring apparatus comprising a tiltable measuring vessel, and temperature controlled error compensating means for said vessels composed of a material having a different co-efficient of expansion from the material of which the vessel is composed for compensating for displacement of the center of gravity of the vessel by expansion and contraction of the vessel material.

10. A measuring apparatus comprising a tiltable measuring vessel composed of a material of a given coefficient of expansion, and temperature error compensating means for said vessel composed of a material of a relatively greater coefficient of expansion than the material of which the vessel is composed and carried by the vessel on that side of the pivot on which is the lesser weight of vessel material.

11. A measuring apparatus comprising a tiltable measuring vessel composed of a material of a given coefficient of expansion, temperature error compensating means for said vessel composed of a material of a different coefficient of expansion from the material of which the vessel is composed, an emptying siphon, and a counter weight for retilting the vessel after emptying.

In witness whereof I have hereunto set my hand this 10th day of September 1909.

WENZEL LEINERT.

Witnesses:
A. WHITE,
C. J. SAWYER.